US006813479B2

(12) United States Patent
Voyer

(10) Patent No.: US 6,813,479 B2
(45) Date of Patent: Nov. 2, 2004

(54) METHOD OF CONTROLLING POWER IN A TELECOMMUNICATION SYSTEM

(75) Inventor: Nicolas Voyer, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 678 days.

(21) Appl. No.: 09/813,217

(22) Filed: Mar. 21, 2001

(65) Prior Publication Data

US 2001/0053670 A1 Dec. 20, 2001

(30) Foreign Application Priority Data

Apr. 19, 2000 (FR) .............................................. 00 05217

(51) Int. Cl.$^7$ .............................. H04B 1/00; H04B 7/00
(52) U.S. Cl. ...................... 455/69; 455/522; 455/67.13; 370/342
(58) Field of Search ................... 455/63.1, 67.11–67.13, 455/522, 422.1–423, 67.16, 67.7, 501, 502, 503, 504, 507, 69; 370/342, 317, 318

(56) References Cited

U.S. PATENT DOCUMENTS

| 5,157,709 | A | * | 10/1992 | Ohteru ........................ 455/465 |
| 5,475,869 | A | * | 12/1995 | Gomi et al. ................ 455/63.1 |
| 6,512,933 | B1 | * | 1/2003 | Kalofonos et al. .......... 455/522 |
| 2003/0064745 | A1 | * | 4/2003 | Benveniste .................. 455/522 |

OTHER PUBLICATIONS

Dongwoo Kim, IEEE Communications Letters, vol. 1, No. 4, pp. 96–98, "Downlink Power Allocation and Adjustment for CDMA Cellular Systems", Jul. 1, 1997.

Dong Do Lee, et al., IEEE Vehicular Technology Conference, vol. Conf. 46, pp. 1120–1124, "Other–Cell Interference with Power Control in Macro/Microcell CDMA Networks", Apr. 28, 1996.

Yuming Lu, IEEE Pacific Rim Conference on Communications, Computers and Signal Processing, Us, New York, NY: Ieee, pp. 501–505, "Performance Evaluation of Unifying Power Control, Error Correction Coding and Scheduling for a DS CDMA Downlink System", Aug. 20, 1997.

* cited by examiner

Primary Examiner—Charles Craver
(74) Attorney, Agent, or Firm—Oblon, Spivak, McClelland, Maier & Neustadt, P.C.

(57) ABSTRACT

A simulation method for the resolution of the power control convergence problem. The power to be transmitted by each mobile station and each base station to assure a proper Qos in the system are computed in an iterative way. At each iterative step, the powers to be received are derived from the level of interference received at the previous iterative step by each network element. Once this is done for each network element, the interference levels are then refreshed. The iterations stop when the biggest gap between estimated and observed interference levels is below a given threshold. One embodiment includes deriving in one step all the power levels to be transmitted by one base station towards many users, assuming a given stable extra cell interference level. In addition, the invention includes a method for taking the dynamic range of power control in both uplink and downlink, and a method for simulation of power control while in the soft handover. Accordingly, the computational complexity of the resolution of the power control convergence problem in CDMA cellular network is drastically reduced. A reduced complexity when cascading successive static simulations is achieved and dynamic simulation is optimized.

20 Claims, 5 Drawing Sheets

METHOD OF CONTROLLING POWER IN A TELECOMMUNICATION SYSTEM

CROSS REFERENCE TO RELATED APPLICATION

This application is based upon and claims the benefit of priority from prior French Patent Application No. 0005217 filed on Apr. 19, 2000, the entire contents of which are incorporated herein by reference.

BACKGROUND OF THE INVENTION

1. Field of the Invention

The present invention concerns a method of controlling power in a telecommunication system comprising a plurality of transmitters Ei and a plurality of receivers Rj, a transmission channel Lij between a transmitter Ei and a receiver Rj being capable of being disturbed by a transmission on a channel Lkl (k,l)≠(i,j).

The present invention more particularly concerns a method of controlling the power of inbound signals or outbound signals in a code division multiple access cellular telecommunication system.

2. Description of Related Art

In a mobile radio telecommunication system of the code division multiple access (CDMA) type, the transmission powers of each of the signals transmitted (by the base stations or by the mobiles) must be adjusted so that the signal to noise plus interference ratio level exactly reaches the required level, depending on the transmission rate of the link and the desired signal quality.

For a given receiver, the signal to noise plus interference ratio is defined as being equal to the ratio between the received signal level and the background noise level plus the received total interference level. The received interference level is then equal to the sum of the received powers of each of the interfering transmitters.

Between each transmitter and each receiver, the transmission channel attenuates the transmitted signal, so that the received signal has a reception power equal to the transmission power decreased by an attenuation specific to the transmission channel between the transmitter and the receiver.

In the case of an uplink (or reverse channel), that is to say where a mobile station Mi transmits a signal to the base station Bf(i) which serves it, the signal to noise plus interference ratio can be written:

$$SNR_i = \frac{PtM_i * G_{i,f(i)}}{No + (1-\eta)\sum_{\substack{j \neq i \\ f(j)=f(i)}} PtM_j * G_{j,f(i)} + \sum_{\substack{j \\ f(j) \neq f(i)}} PtM_j * G_{j,f(i)}} \quad (1)$$

where
- PtMi is the transmission power of the signal transmitted by the mobile Mi;
- η is the intracellular interference reduction factor;
- Gi,k is the attenuation coefficient of the transmission channel between the mobile Mi and the base station Bk;
- f(i) is the index of the base station serving the mobile Mi;
- N0 is the power level of the background noise.

The second term appearing in the denominator of the equation (1) represents the intracellular interference, interference generated by the mobiles Mj served by the same base station Bf(i). The third term appearing in the denominator represents the extracellular interference, interference generated by the mobiles Mj situated outside the cell Cf(j) served by the base station Bf(j).

In the case of a downlink (or forward channel), that is to say where a mobile Mi receives a signal from the base station Bf(i) which serves it, the signal to noise plus interference ratio can be written:

$$SNR_i = \frac{PtB_{f(i),i} * G_{i,f(i)}}{No + \alpha(PtB_{f(i)} - PtB_{f(i),i})G_{i,f(i)} + \sum_{k \neq f(i)} PtB_k * G_{i,k}} \quad (2)$$

$$PtB_k = PtcB_k + \sum_{\forall i/f(i)=k} PtB_{f(i),i}$$

where
- PtBf(i),i is the transmission power of the signal transmitted from the base station Bf(i) to the mobile Mi;
- PtcBk is the power of the common signals transmitted by the base station Bk;
- PtBk is the total or composite power level transmitted by the base station Bk to all the mobiles served by it;
- Gi,k is the attenuation coefficient of the transmission channel between the base station Bk and the mobile Mi.

The second term appearing in the denominator of the equation (2) represents the intracellular interference, interference due to the signals transmitted by the base station Bf(i) to the mobiles it serves. The third term appearing in the denominator of the equation (2) represents the extracellular interference, interference due to the signals transmitted by the base stations other than Bf(i).

The power control mentioned above aims to search for the power levels PtMi (in the uplink case) and PtBf(i),i (in the downlink case) making it possible to achieve the signal to noise plus interference ratios required for the different links between mobiles and base stations.

It is known, for example from the article entitled "Downlink power allocation and adjustments for CDMA cellular systems" by Dongwoo Kim published in IEEE Communications Letters, Vol. 1, n° 4, July 1997, that provision can be made for each mobile to measure the interference level it receives and transmit this information to the base station which serves it. The different base stations then indicate to the different mobiles what transmission power levels they must respectively use in order to achieve the desired signal to noise ratio. This type of algorithm provides a convergence of the transmission power levels without any entity having to know all the parameters of the system. However, the major drawback of this type of algorithm lies in the necessity, in order to provide its convergence, of very frequently refreshing the power values of all the transmitters. If all the calculations have to be carried out in a single calculation unit, this implies a sizeable quantity of calculations to be performed, which in practice makes the precise simulation of this type of phenomenon inaccessible to existing calculation units.

Furthermore, this calculation complexity does not allow the dynamic behaviour of the system to be followed, when characteristics of a transmission channel are modified over time.

An alternative approach would be to express the problem in matrix fashion, having an a priori knowledge of all the parameters of the system. In fact the problem can then be expressed in the form A×P=B where P would be the vector of the transmission power levels. To solve the problem it is therefore sufficient to find the matrix A−1 which is the inverse of A such that A−1A=I, the identity matrix. Then, the vector of the powers P can be obtained according to: P=A−1B.

The problem of this matrix approach is that it also quickly becomes unusable as soon as there are several hundred base stations or a few thousand mobile stations to be dealt with. This is because the matrix inversion problem is an N3 problem. The matrix approach is therefore not shown any further here.

What is more, this purely mathematical approach in no way takes account of constraints on the transmission powers. These must in practice be between a predetermined maximum power value and a predetermined minimum power value. Thus, the matrix inversion may result in power values which are too large or too small, that is to say outside the range of acceptable values.

Finally, matrix processing is unsuited to dealing with soft handover. Soft handover is the ability of the network to establish for example (uplink case) a number of simultaneous links between a mobile station and a number of base stations and thus guarantee an overall transmission quality despite the failure of an elementary link. In such a case, only the sum of the signal to noise plus interference ratio levels of the signals on the links concerned counts. Taking the sum of these ratios into consideration amounts to transforming a linear problem into a quadratic problem not capable of being solved by a simple matrix method.

The problem at the root of the invention is that of power control in a telecommunication system with a plurality of transmitters and a plurality of receivers requiring only a reasonable number of calculations.

More specifically, the problem at the root of the invention is transmission power control of reduced complexity for an uplink or a downlink of a cellular telecommunication system working in code division multiple access mode.

BRIEF SUMMARY OF THE INVENTION

According to one advantageous embodiment of the invention, the power control is made compatible with compliance with the transmission power ranges.

According to another advantageous embodiment of the invention, the power control is compatible with operation of the system in soft handover mode.

According to another advantageous embodiment of the invention, the power control can be performed dynamically in order to follow the variations in system characteristics.

BRIEF DESCRIPTION OF THE DRAWINGS

The characteristics of the invention mentioned above, as well as others, will emerge more clearly from a reading of the following description of an example embodiment, said description being given in relation to the accompanying drawings, amongst which.

DETAILED DESCRIPTION OF THE INVENTION

Figure 1:
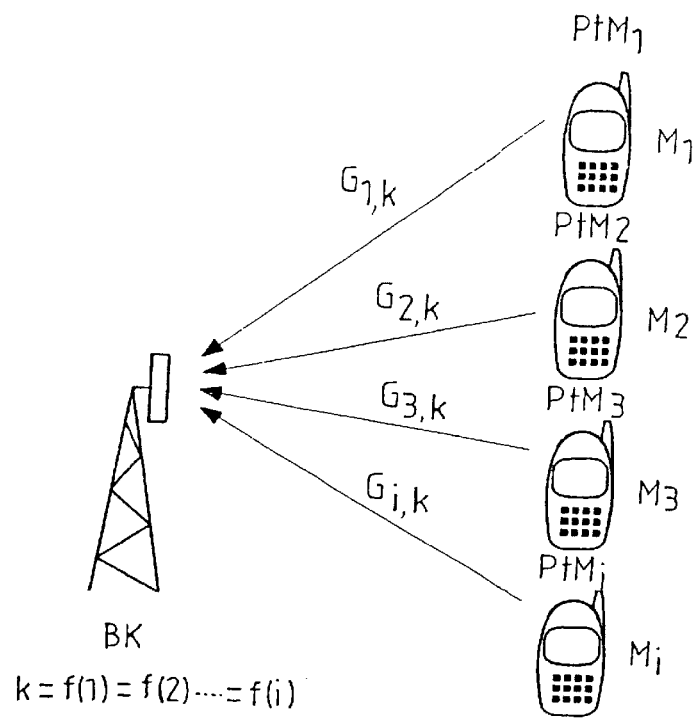
FIG. 1 depicts uplinks between mobiles and an isolated base station serving them.

FIG. 1 depicts the case of an isolated base station serving a plurality of mobiles M1, M2, . . . Mi which establish uplinks with said base station.

The power control in the unicellular case amounts to searching for the transmission powers PtMi of the different mobiles knowing the signal to noise ratios SNRi required for the links with the base station.

The equation (1) can then be written:

$$SNR_i = \frac{P_i}{N_o + (1-\eta)\sum_{j \neq i} P_j}$$

SNRi=signal to noise ratio of the signal received by the base station and transmitted by the mobile station Mi;
Pi=PtMi*Gi,k power received by the base station of the signal transmitted by the mobile station Mi;
η=intracellular interference reduction factor.

As shown in Annexe A, the solution to this problem is given by:

$$P_i = \frac{SNR_i * D_{Factor}}{1 + (1-\eta)SNR_i} \quad (3)$$

$$\text{and } d_j = 1 + \frac{1}{SNR_j(1-\eta)}$$

$$\text{with } D_{Factor} = \frac{N_o}{1 - \sum_j \frac{1}{d_j}} \quad (4)$$

The transmission powers of the mobile stations Mi are then given by:

$$PtM_i = \frac{P_i}{G_{i,k}}$$

Figure 2:
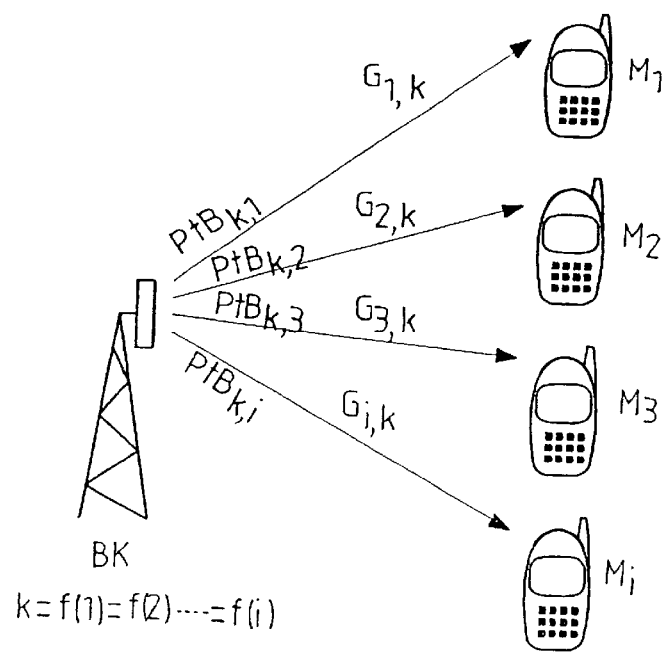
FIG. 2 depicts downlinks between an isolated base station and mobiles which it serves.

FIG. 2 depicts the case of an isolated base station serving a plurality of mobiles M1, M2, . . . Mi and establishing downlinks with said mobiles.

The power control in the unicellular case amounts to searching for the transmission powers PtBk,i of the signals transmitted by the base station Bk to the different mobiles Mi knowing the signal to noise ratios SNRi required for the downlinks.

The equation (2) can then be written:

$$SNR_i = \frac{PtB_k * G_{i,k}}{No + \alpha(PtB_k - PtB_{k,i})G_{i,k}}$$

$$\text{with } PtB_k = PtcB_k + \sum_{\forall i / f(i) = k} PtB_{f(i),i}$$

If the transmission power level PtBk of the base station is known, the solution is written simply:

$$PtB_{k,i} = \frac{SNR_i}{1 + \alpha SNR_i} \frac{N_0 + \alpha PtB_k * G_{i,k}}{G_{i,k}} \quad (5)$$

Figure 3:
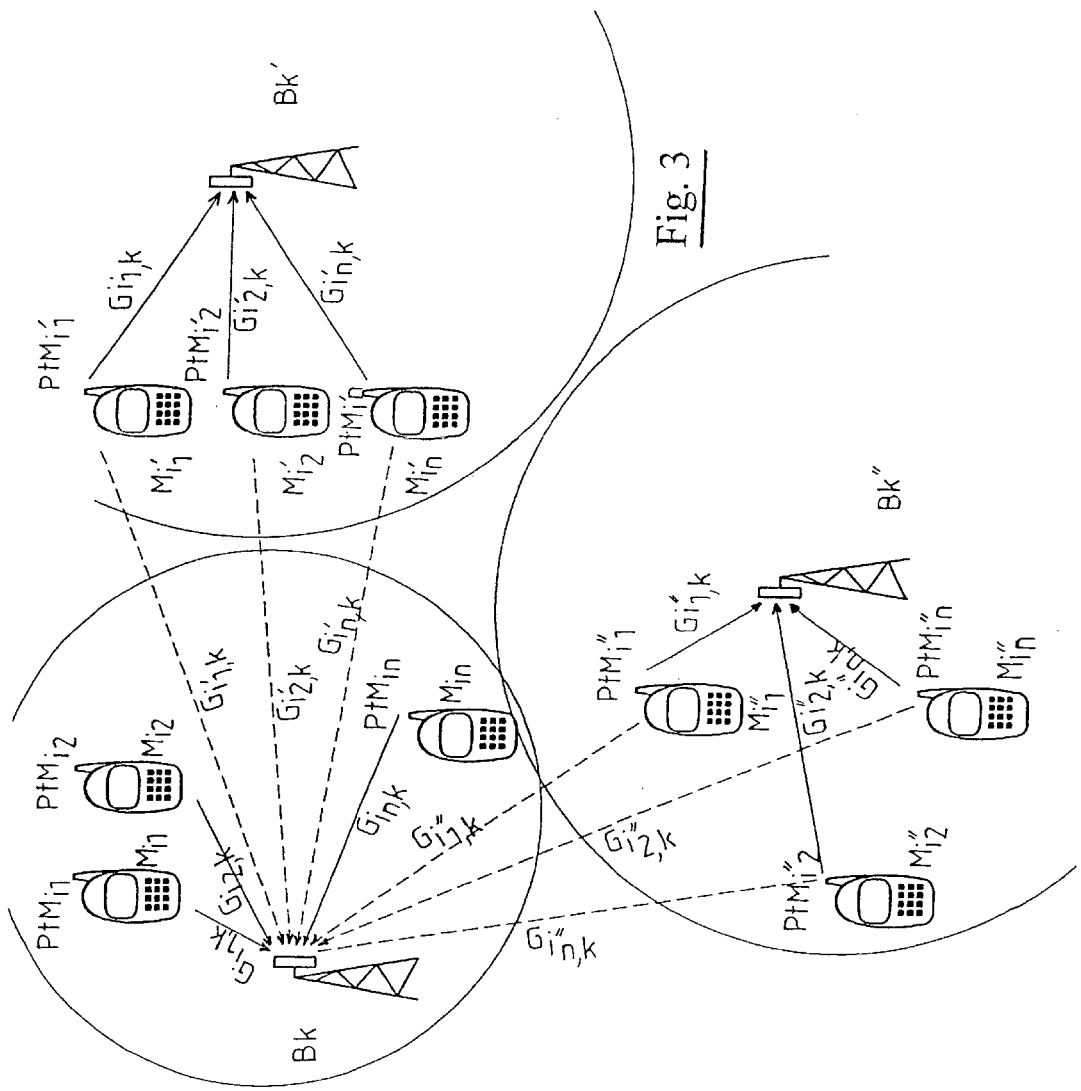
FIG. 3 depicts a group of adjacent cells with interfering uplinks.

FIG. 3 illustrates a cellular telecommunication system composed of a plurality of adjacent cells, each base station Bk serving a plurality of mobiles Mi1, Mi2, . . . Mi1n, The links under consideration are uplinks.

The base station Bk receives useful signals from the different mobiles Mi1, Mi2 . . . , Min which it serves but also interfering signals coming from mobiles served by other base stations.

The invention is based on the observation that the case of a number of adjacent base stations can be reduced to the case of a number of isolated base stations provided that, for each base station, the extracellular interference level produced by the mobiles situated outside the cell under consideration can be assessed.

This is because, if it is assumed that the extracellular interference level is known for each base station, said level is added to the background noise level and the situation is reduced to the juxtaposition of N unicellular problems whose solution was described with reference to FIG. 1.

However, evaluating the extracellular interference level for a base station requires knowing the transmission powers of the mobile stations outside the cell, powers which themselves depend on the extracellular interference levels of their respective serving cells and therefore, in particular, on the transmission powers of the mobiles of the cell which is precisely what it is being sought to determine.

The solution proposed by the invention consists of a recursive determination of the extracellular interference level for each cell. At each iteration, an estimated extracellular interference level for each base station is used. This level is used to obtain the transmission powers of the mobile stations served by this base station, according to the unicellular method mentioned above. Once all the stations have been dealt with, the extracellular interference received by each cell is again calculated from the transmission powers of the mobile stations situated outside the cell served by said station. These steps are repeated as long as a difference judged excessive is observed between two consecutive extracellular interference levels for one and the same base station.

Figure 4:
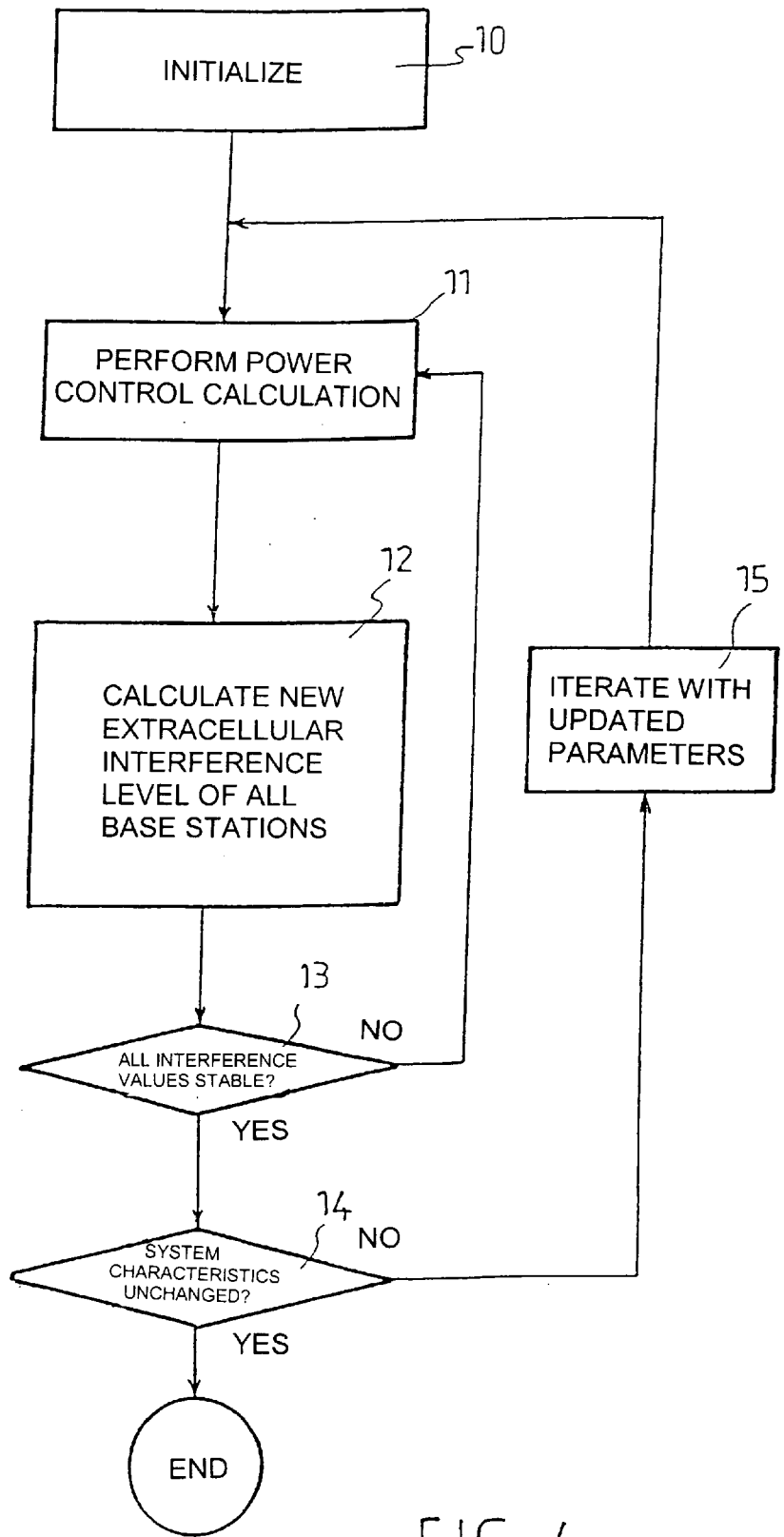
FIG. 4 depicts the steps of the power control method according to the invention in the case of the system of FIG. 3.

FIG. 4 illustrates the method of recursive determination of the extracellular interference level in an uplink.

The determination method starts with an initialization step (10).

The extracellular interference level Iextk is initialized for each cell k, for example to a zero value or to the value issuing from a previous estimation:

$\forall k$, Iext_oldk=0

A margin is also defined beforehand to parameterize the accuracy of the recursive method. The reduction of this margin will have the effect of increasing the iteration frequency and improving the convergence accuracy. The difference between two extracellular interference levels must be made to be less than this margin. The difference between two consecutive extracellular interference levels is initialized to twice this margin, so that the initial difference is to be considered as a margin taken on the required signal to noise ratio level: $\forall k$, Deltak=2*margin.

Thus, the signal to noise ratio level obtained at the end of an iteration will be between the required signal to noise and this value plus twice said margin.

In a first step (11), the power control calculation is performed according to the unicellular method for all base stations which have an extracellular interference estimate judged excessive (that is Deltak>Margin). To do this, the equation (3) is used, replacing, in the formula (4), No by No+Iext_upk where Iext_upk (which in the present section will be written Iext_oldk) is the extracellular interference level estimated last. In other words, the step (11) can be summarized by:

$\forall k$ if Deltak>margin, $\forall i$ such that f(i)=k, calculate PtMi according to (3)

In a second step (12), the new extracellular interference level Iext_newk is calculated for all base stations from the transmission power values PtMi calculated last. The estimation error is next obtained as the absolute value of the logarithm of the ratio Iext_newk/Iext_oldk where Iext_oldk is the previous interference level. If this error exceeds the level margin judged reasonable, the level Iext_oldk is refreshed to the value Iext_newk, and a new iteration will be performed for this base station. In other words, the step (12) can be summarized by:

End = 1;

$$\forall k, \text{Iext\_new}_k = \sum_{i, f(i) \neq k} PtM_i G_{i,k};$$

$$\forall k, Delta_k = \left| \ln \frac{\text{Iext\_new}_k}{\text{Iext\_old}_k} \right|;$$

$\forall k$, If Deltak>margin then Iext_oldk=Iext_newk, End=0;

where End is a termination flag.

The first loop (static simulation) terminates when all the extracellular interference values are stable to within the margin. If the variation between two consecutive extracellular interference values for any base station exceeds the margin (that is to say if End=0) the loop is iterated. This termination test (End=1?) is depicted at (13).

It should be noted that the complexity of the algorithm is a 0(N) complexity.

When the characteristics of the system change over time, for example if a mobile changes cell or if a link is broken/created, it is desirable to carry out a new evaluation of the extracellular interference levels. The test of non-variation of the system characteristics is depicted at (14). If these characteristics are unchanged, the algorithm terminates. Otherwise, the loop described above is iterated (dynamic simulation) with updated parameters (f(i), SNRi, Gk,i) at (15). The extracellular interference levels estimated last are used as initial values for the new loop.

It is possible in the first step above to take into account the minimum and maximum values of transmission power of the mobiles. This can be achieved very simply by replacing the out of range value PtMi by the minimum value, respectively by the maximum value.

Furthermore, the power control method can support a network managed in soft handover mode.

As already indicated above, the soft handover mode consists, for the uplink, of receiving, by different base stations, the same signal transmitted by one mobile station. The received signals representing the same transmitted signal can be recombined in order to improve the quality of the communication.

Various recombination techniques exist. The most common consists of demodulating each of these signals independently, and selecting the signal which has the best quality after demodulation (a technique also known as Selection Combining). In the latter case, the signal transmitted by the mobile station in a soft handover situation does not differ from that which it would have had to transmit in a non-soft handover situation.

The diversity added in the process of soft handover can nevertheless result in a lower transmission power level necessary for providing a certain quality of service. This can easily be taken into account by considering a gain in the required SNR. This gain is, however, dependant upon the environment. In environments with high diversity (broad signal delay dispersion, reception diversity, transmission diversity, etc. the additional gain is marginal and can be neglected.

According to one embodiment of the invention, a sorting of the links which a base station has with the different mobile stations is performed. The links which correspond to the best link of a mobile station (amongst the links of this mobile station with various base stations) are alone taken into account for determination of the unicellular power control. The other links are simply considered as extracellular interference. The power control method can therefore support soft handover with no change in principle.

Finally, the power level calculations can be simplified if, in the equation (1), only contributions from the mobile stations most strongly received by the base station Bf(i) are taken into account for evaluating the extracellular interference. In this case the equation (1) can be written:

$$SNR_i = \frac{PtM_i * G_{i,f(i)}}{No + (1-\eta) \sum_{\substack{j \neq i \\ f(j) = f(i)}} PtM_j * G_{j,f(i)} + \sum_{\substack{j \\ f(j) \neq f(i) \\ f(j) \in E(i)}} PtM_j * G_{j,f(i)}}$$

where E(i) is the set of mobile stations most strongly received by the base station Bf(i). Contributions outside the set E(i) are assumed to be zero and play no further part in the calculation.

Figure 5:
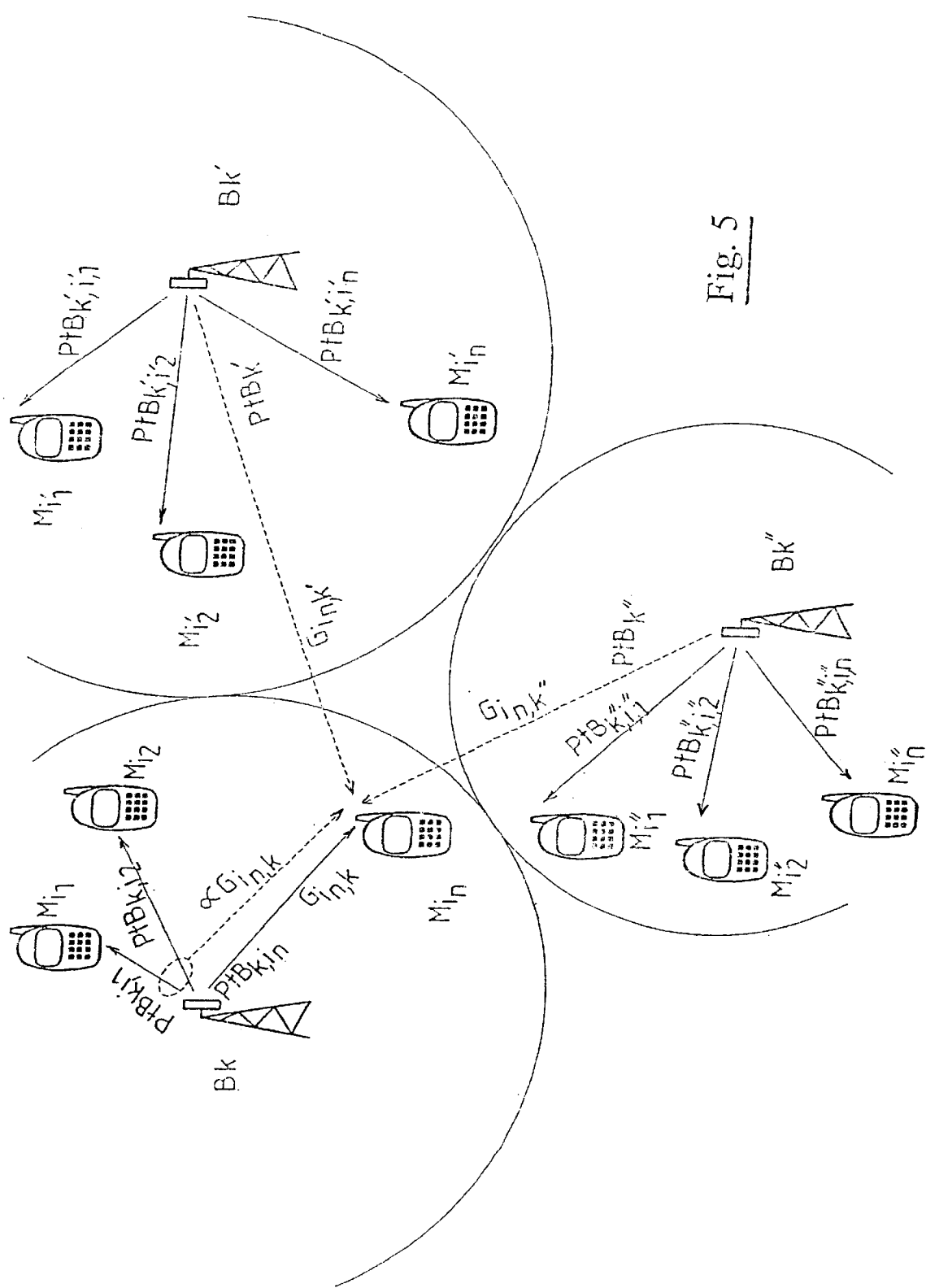
FIG. 5 depicts a group of adjacent cells with interfering downlinks.

FIG. 5 illustrates a cellular telecommunication system composed of a plurality of adjacent cells, each base station Bk serving a plurality of mobiles Mi1, Mi2, . . . Miln, The links under consideration are downlinks.

The base station Bk transmits useful signals to the mobiles Mi1, Mi2 . . . , Min. A given mobile will receive a useful signal from its serving station but also interfering signals coming from mobiles served by other base stations. A link between a mobile Mi and its serving base station will be also affected by the other links between the other mobiles of its cell and the serving station owing to the imperfect orthogonality of the transmitted outbound signals (intracellular interference).

The invention is based on the observation that the case of a number of adjacent base stations can be reduced to the case of a number of isolated base stations provided that, for each mobile, the extracellular interference level produced by the base stations other than the serving station can be assessed.

The same approach as for the uplink can be adopted. The equation (5) can then be rewritten, replacing N0 by N0+Iext_downi where Iext_downi (which in the present section will be written Iexti) is the extracellular interference received by the mobile Mi:

$$PtB_{f(i),i} = \frac{\left( (\alpha-1)PtB_{f(i)} + \frac{No + \sum_{\forall k} PtB_k * G_{i,k}}{G_{i,f(i)}} \right) SNR_i}{(1 + \alpha SNR_i)} \quad (6)$$

Just as for the uplink, the solution proposed by the invention consists of a recursive determination of the extracellular interference level for each mobile. At each step, it is assumed that these levels are known and the power values of the signals PtBf(i),i are deduced therefrom according to the equation (6). Then, these transmission power levels are used to determine the value of the effective interference level received by each mobile. These steps are repeated as long as a difference judged excessive is observed between two consecutive interference levels received by a mobile station.

Figure 6:
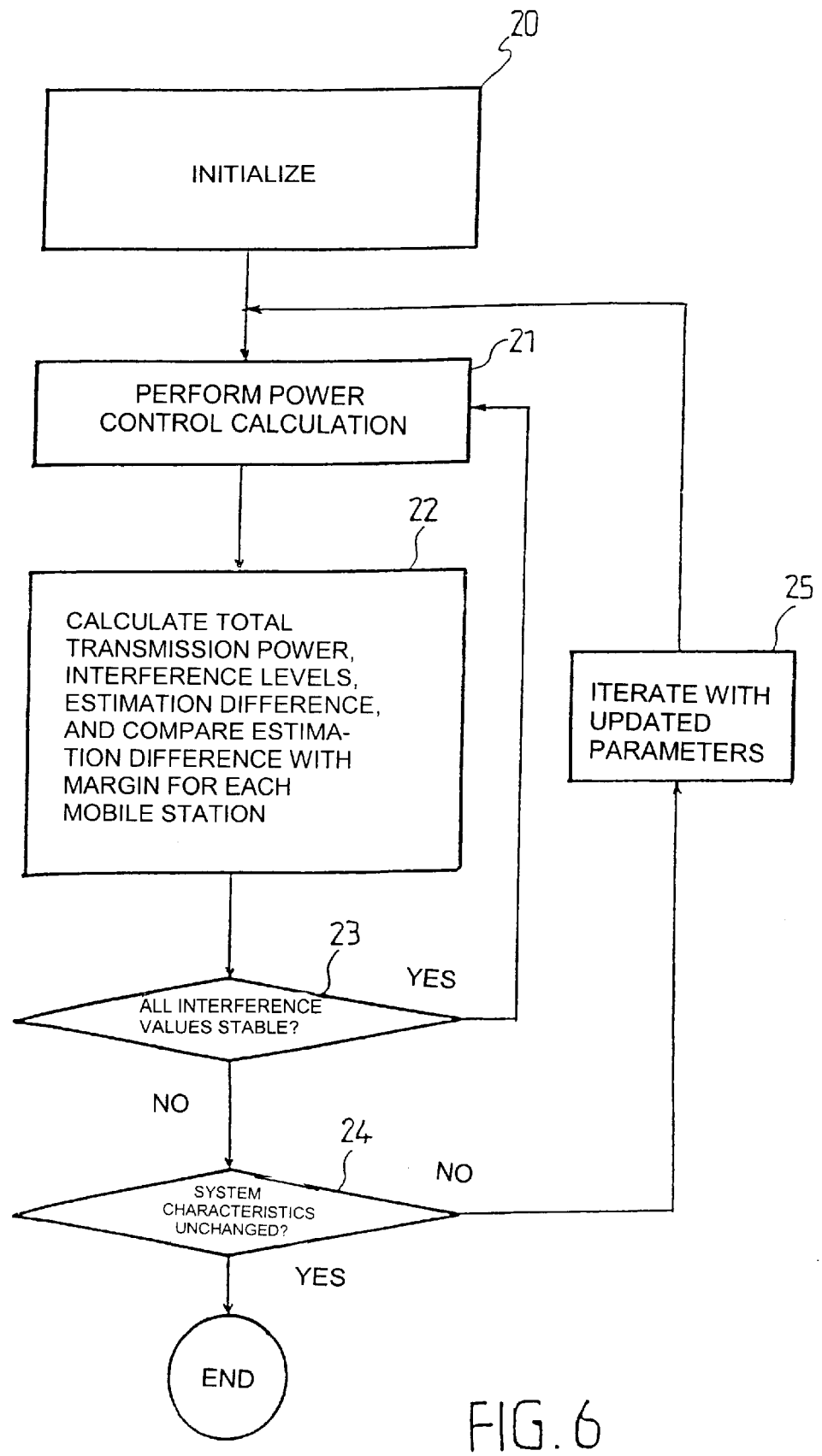
FIG. 6 depicts the steps of the power control method according to the invention in the case of the system of FIG. 5.

FIG. 6 illustrates the method of recursive determination of the extracellular interference level for a downlink.

The determination method starts with an initialization step (20).

The total transmission power level PtBk of each base station is initialized, for example to the power value of the common signals PtcBk or to the value of a previous estimation. In other words: ∀k, PtBk=PtcBk.

The initial extracellular interference level of each mobile is next deduced therefrom:

$$\forall i, \; Iext\_old_i = N_0 + \sum_k PtB_k * G_{i,k} + (\alpha - 1)PtB_{f(i)}G_{i,f(i)}$$

A margin is also defined beforehand to parameterize the accuracy of the recursive method. The reduction of this margin will have the effect of increasing the iteration frequency and improving the convergence accuracy. The difference between two extracellular interference levels must be made to be less than this margin. The difference between two consecutive extracellular interference levels is initialized to twice this margin, so that the initial difference is to be considered as a margin taken on the required signal to noise ratio level. In other words:

∀i, Deltai=2*margin.

Thus, the signal to noise ratio level obtained at the end of an iteration will be between the required signal to noise and this value plus twice the margin.

In a first step (21), the power control calculation is performed according to the unicellular method for all mobile stations which have an estimate of extracellular interference judged excessive (that is Deltai>Margin). To do this, the equation (6) is used, replacing, in the formula (4), No by No+Iext_downi, where Iext_downi (which in the present section will be written Iext_oldi) is the extracellular interference level estimated last. In other words, the step (21) can be summarized by:

∀i, if Deltai>margin, calculate PtBi,f(i) according to (6)

In a second step (22), there is first calculated the total transmission power of each base station from the values PtBf(i),i (and the common signals) and then the new extracellular interference levels Iext_newi for all mobile stations from the transmission power values PtMi calculated last. The estimation difference is next obtained as the absolute value of the logarithm of the ratio Iext_newi/Iext_oldi where Iext_oldi is the previous interference level. If this difference exceeds the margin judged reasonable, the level Iext_oldi is refreshed to the value Iext_newi, and a new iteration will be performed for this mobile station. In other words, the step (22) can be written:

End =1;

$$\forall k, \; PtB_k = PtcB_k + \sum_{i, f(i)=k} PtB_{f(i),i};$$

$$\forall i, \; Iext\_new_i = N_0 + \sum_k PtB_k * G_{i,k} + [(\alpha-1)PtB_{f(i)} + \alpha PtB_{f(i),i}]G_{i,f(i)};$$

$$\forall i, \; Delta_i = \left| \ln \frac{Iext\_new_i}{Iext\_old_i} \right|;$$

∀i, If Deltai > margin the Iext_oldi = Iext_newi, End = 0;

where End is a termination flag.

The first loop (static control) terminates when all the extracellular interference values are stable to within the margin. If the variation between two consecutive extracellular interference values for any mobile station exceeds the margin (that is to say if End=0) the loop is iterated. This termination test is depicted at (23).

It should be noted that the complexity of the algorithm is here also a 0(N) complexity.

When the characteristics of the system change over time, for example if a mobile changes cell or if a link is broken/ created, it is desirable to carry out a new evaluation of the extracellular interference levels. The test of non-variation of the system characteristics is depicted at (24). If these characteristics are unchanged, the algorithm terminates. Otherwise, the loop described above is iterated (dynamic simulation) with updated parameters (f(i), SNRi, Gk,i) at (25). The total power levels of the base stations estimated last are then used as initial values for the new loop.

It is possible in the second step above to take into account minimum and maximum values of total transmission power of the base stations. This can be achieved very simply by replacing the out of range value PtBk by the minimum value, respectively by the maximum value.

Furthermore, it is also possible in the second step above to take into account the minimum and maximum values of dedicated transmission power PtBk,i of any base station Bk to a mobile station Mi. This can be achieved very simply by replacing the out of range value PtBk,i by the minimum value, respectively the maximum value.

Furthermore, the power control method can support a network managed in soft handover mode.

The soft handover mode consists, for the downlink, of receiving, by a mobile station, the same signal transmitted by different base stations. The received signals representing the same transmitted signal can be recombined in order to improve the quality of the communication. The fact that, in the downlink, the same receiver receives the different signals enables a more judicious recombination than in the uplink, namely a weighted recombination of all these signals (a technique also known as Maximum Ratio Combining). This recombination is judiciously implemented in the RAKE receiver of the mobile station.

The property of RAKE receivers is that the signal to noise ratio of the recombined signal is equal to the sum of the signal to noise ratios of the signals used for the recombination.

It may be seen that taking into account the latter constraint necessitates solving a slightly different problem from the first one, namely:

$$SNR_i = \sum_{l<AS_i} SNR_{i,l}$$

$$SNR_{i,l} = \frac{PtB_{f(i,l),i} * G_{i,f(i,l)}}{No + \alpha(PtB_{f(i,l)} - PtB_{f(i,l),i})G_{i,f(i,l)} + \sum_{k \neq f(i)} PtB_k * G_{i,k}}$$

where ASi is the size of the set of active bases for the mobile Mi. If it is assumed in addition that the network is able to carry out the function of balancing the power transmitted by the various base stations involved in each handover, the following can be rewritten:

$$\forall l < AS_i, PtB_{f(i,l),i} = P_i$$

$$P_i = \frac{SNR_{i,l}}{G_{i,f(i,l)}} \frac{(P_{total} - (1-\alpha)G_i PtB_{f(i,l)})}{1 + \alpha SNR_{i,l}}$$

$$SNR_i = \sum_{l<AS_i} SNR_{i,l}$$

with $P_{total} = N_0 + \sum_k PtB_k * G_{i,k}$

It should be noted that, even expressed literally in its most general form, the problem is no longer linear (a sum of fractions not having the same denominator). It can however be solved according to an advantageous embodiment of the invention, by assuming that:

$$1 \gg \alpha SNR_{i,l}$$

This amounts to saying that the transmission channel does not have a very disturbing effect in terms of orthogonality preservation, or even that the transmission rate used necessitates low required SNR (on account of the spectrum spreading). The following is then obtained:

$$P_i = \frac{SNR_{i,l}}{G_{i,f(i,l)}}(P_{total} - (1-\alpha)G_i PtB_{f(i,l)})$$

$$SNR_i = \sum_{l<AS_i} SNR_{i,l}$$

That is directly $$P_i = \frac{SNR_i}{\sum_{l<AS_i} \frac{G_{i,f(i,l)}}{P_{total} - (1-\alpha)G_{i,f(i,l)} PtB_{f(i,l)}}}$$

Finally, as for the uplink, the power level calculations can be simplified if there are taken into account in the equation (2), for evaluating the extracellular interference, only contributions from the base stations most strongly received by the mobile station Mi. In this case the equation (2) can be written:

$$SNR_i = \frac{PtB_{f(i),i} * G_{i,f(i)}}{No + \alpha(PtB_{f(i)} - PtB_{f(i),i})G_{i,f(i)} + \sum_{\substack{k \neq f(i) \\ k \in E(i)}} PtB_k * G_{i,k}}$$

where E(i) is the set of base stations most strongly received by the mobile station Mi. Contributions outside the set E(i) are assumed to be zero and play no further part in the calculation.

Annexe A

These equations can be reformulated:

$$\sum_{j \neq i} P_j - \frac{P_i}{SNR_i(1-\eta)} = -\frac{N_o + I_{ext}}{(1-\eta)} = L_i \quad (10)$$

Let the following N×N square matrices now be defined:

$$D = \begin{bmatrix} d_0 & 0 & 0 & \cdots & 0 \\ 0 & d_1 & 0 & \cdots & 0 \\ 0 & 0 & d_2 & \cdots & 0 \\ \cdots & \cdots & \cdots & \cdots & \cdots \\ 0 & 0 & 0 & \cdots & d_{N-1} \end{bmatrix} \text{ with } d_i = -1 - \frac{1}{SNR_i(1-\eta)}$$

$$A = \begin{bmatrix} 1 & 1 & 1 & \cdots & 1 \\ 1 & 1 & 1 & \cdots & 1 \\ 1 & 1 & 1 & \cdots & 1 \\ \cdots & \cdots & \cdots & \cdots & \cdots \\ 1 & 1 & 1 & \cdots & 1 \end{bmatrix}$$

Solving the system of equations (10) amounts to finding the vector $\overline{P} = (P_0, P_1, \ldots P_{N-1})$ which verifies the following equation:

$$(D+A) \circ \vec{P} = \vec{L} \quad \text{that is} \quad \vec{P} = (D+A)^{-1}\vec{L}$$

$$\text{where} \quad \vec{L} = -\frac{N_o + I_{ext}}{(1-\eta)}(1, 1, \ldots 1)$$

In the majority of cases, (D+A) can easily be inverted as follows:

$$(D+A)^{-1} = \left[I - \frac{1}{1+S}D^{-1} \circ A\right] \circ D^{-1}$$

$$\text{where} \quad S = \sum_i \frac{1}{d_i}$$

If the following is defined:

$$\sum = \sum_j \frac{L_j}{dj}$$

the above solution is also expressed according to:

$$P_i = \frac{1}{d_i}\left(L_i - \frac{\sum}{1+S}\right)$$

It should be noted that Li is the same $\forall i$, which is also reduced according to:

$$P_i = \frac{1}{d_i}\left(L_i - \frac{\sum}{1+S}\right)$$

that is:

$$P_i = \frac{N_o + I_{ext}}{(1-\eta) + 1/SNR_i}\left(\frac{1}{1+S}\right) = \frac{D_{Factor}}{(1-\eta) + \frac{1}{SNR_i}}$$

What is claimed is:

1. A method of controlling the power of inbound signals in a code division multiple access cellular telecommunication system comprising a plurality of base stations Bk serving respectively cells Ck and a plurality of mobile stations Mi, each mobile station Mi being served by at least one base station Bf(i), each uplink between a mobile station Mi and the base station Bf(i) being disturbed by noise comprising extracellular interference generated by the inbound signals of mobile stations situated outside the cell Cf(i) and intracellular interference generated by the inbound signals of mobile stations Mj,j≈i situated inside the cell Cf(i) said method being characterised by the following steps:

(a) for each base station Bk, initialization of the extracellular interference level Iextra_up,k to a predetermined value;

(b) for each mobile station Mi, calculation of the power level PtMi of the inbound signal allowing the uplink between said mobile station and the serving base station Bf(i) to guarantee a predetermined signal to noise ratio SNRi given the current extracellular interference level Iextra_up, f(i) of the cell Cf(i);

(c) for each base station Bk, evaluation of the extracellular interference level Iextr_up,k of the cell Ck according to the current power levels PtMi of the inbound signals transmitted by mobile stations situated outside the cell Ck;

the steps (b) and (c) being iterated as long as the difference between two consecutive extracellular interference levels of any cell Ck exceeds a predetermined margin value.

2. A power control method according to claim 1, characterised in that, at the step (b), the calculation of the power level PtMi of the mobile stations Mi served by a base station Cf(i) is not performed if the difference between the current level and the previous level of extracellular interference Iextra_up,f(i) of the cell Cf(i) is less than said margin value.

3. A power control method according to claim 2, characterised in that, at the step (b), the power levels PtMi are limited to a maximum value and a minimum value.

4. A power control method according to claim 2 or 3, characterised in that, at the step (c), the current extracellular interference level of a cell Ck is not refreshed to the newly evaluated value if the difference between the newly evaluated value and the previous value is less than said margin value.

5. A power control method according to claims 2 or 3, characterised in that, at the step (a), the difference between two consecutive extracellular interference values is initialized to twice said margin value.

6. A power control method according to claims 1, 2 or 3, characterised in that the calculation of the power level PtMi of the step (b) is performed according to the following formula:

$$PtMi = \frac{1}{G_{i,f(i)}} SNR_i \cdot \frac{D_{factor}}{1 + (1-\eta)SNR_i}$$

$$\text{where} \quad D_{factor} = \frac{N_0 + \text{Iextra\_up}, f(i)}{1 - \sum_j 1/dj}$$

$$\text{with} \quad dj = 1 + \frac{1}{(1-\eta)SNR_j}$$

$\eta$ being the intracellular interference reduction factor $G_{i, f(i)}$ being the attenuation factor of the uplink from Mi to $B_{f(i)}$ $N_0$ being the power level of the background noise and that the evaluation of the extracellular interference level Iextra_up,k of the step (c) is performed according to the formula:

$$\text{Iextra\_up}, k = \sum_{\forall i, f(i) \neq k} PtM_i * G_{i,k}$$

where $G_{i, k}$ is the attenuation factor of the transmission from the mobile Mi to the base station $B_k$ 7. A power control method according to claim 6, characterised in that, in the calculation of Iextra_up,k, only the terms corresponding to the most interfering mobile stations are taken into account.

8. A power control method according to claims 1, 2 or 3, characterised in that the iteration loop of the steps (b) and (c) is itself iterated when a characteristic of an uplink between a mobile station Mi and its serving base station Bf(i) is modified or when a mobile changes serving station.

9. A method of controlling the power of outbound signals in a code division multiple access cellular telecommunication system comprising a plurality of base stations Bk serving respectively cells Ck and a plurality of mobile stations Mi, each mobile station Mi being served by at least one base station Bf(i), each downlink between the base station Bf(i) and a mobile station Mi being disturbed by noise Iext_down,i comprising extracellular interference generated by the outbound signals of base stations Bk, k≠f(i) and intracellular interference generated by the outbound signals of the base station Bf(i) to mobile stations Mj, j≠i, said method being characterised by the series of following steps:

(a) for each base station Bk, initialization of the total power level PtBk transmitted by the base station Bk, to a predetermined value;

(b) for each mobile station Mi, initialization of the noise level received Iext_down,i according to the total power levels PtBk;

(c) for each mobile station Mi, calculation of the power level PtBf(i),i of the outbound signal which the base station Bf(i) must transmit to the mobile station Mi to allow the downlink between said base station and said mobile station to guarantee a predetermined signal to noise ratio SNRi, given the current total power levels PtBk;

(d) for each mobile station Mi, evaluation of the noise level received Iext_down,i according to the current power levels PtBf(k),k, k≠i;

the steps (c) and (d) being iterated as long as the difference between two consecutive levels of noise received by any mobile Mi exceeds a predetermined margin value.

10. A power control method according to claim 9, characterised in that, at the step (c), the calculation of the power level PtBf(i),i of the outbound signal which the base station Bf(i) must transmit to the mobile station Mi is not performed if the difference between the current level and the previous level of the noise received by the mobile station Mi is less than said margin value.

11. A power control method according to claim 10, characterised in that, at the step (c), the power levels PtBk are limited to a minimum value and a maximum value.

12. A power control method according to claim 10, characterised in that, at the step (c), the power levels PtBk,i are limited to a minimum value and a maximum value.

13. A power control method according to claim 10, characterised in that, if a mobile station Mi is served by a subset SBi of base stations Bf(i,l), the signals received from these said base stations are recombined in a RAKE receiver, and that, at the step (c), the transmission powers PtBf(i,l),i of the outbound signals transmitted by the base stations Bf(i,l) to the mobile station Mi are chosen equal to $$PtB_{f(i,l),i} = Pi = \frac{SNR_i}{\sum_{i \in SB_i} \frac{G_{i,f(i,l)}}{Ptotal(i) - (1-\alpha)G_{i,f(i,l)}PtB_{f(i,l)}}}$$

where $PtB_{f(i,l)}$ is the total power transmitted by the station Bf(i,l) and $$Ptotal(i) = N_0 + \sum_k PtB_k * G_{i,k}$$

is the total power received by the mobile Mi
$N_0$ is the power level of the background noise
$G_{i,k}$ is the attenuation factor of the link from the base station Bk to the mobile Mi
$\alpha$ is an orthogonality factor of the signals transmitted by one and the same base.

14. A power control method according to one of claims 9 to 12, characterised in that, at the step (d), the received noise level Iext_down,i is not refreshed to the newly evaluated value if the difference between the newly evaluated value and the previous value is less than said margin value.

15. A power control method according to one of claims 9 to 12, characterised in that, at the step (a), the difference between two consecutive extracellular interference values is initialized to twice said margin value.

16. A power control method according to one of claims 9 to 12, characterised in that the calculation of the power level PtBf(i),i of the step (c) is performed according to the following formula:

$$PtB_{f(i),i} = \frac{\left((\alpha-1)PtB_{f(i)} + \frac{N_0 + \sum_k PtB_k * G_{i,k}}{G_{i,f(i)}}\right)SNR_i}{(1+\alpha SNR_i)}$$

where $\alpha$ is an orthogonality factor of the signals transmitted by one and the same base and $G_{i,k}$ is the attenuation factor of the link between the mobile Mi and the base Bk
$N_0$ is the power level of the background noise
$PtB_k$ is the total power transmitted by the base k
and in that the calculation of the noise level Iext_down,i of the step (d) is performed according to the following formula:

$$\text{Iext\_down, } i = N_0 + \sum_k PtB_k * G_{i,k} + ((\alpha-1)PtB_{f(i)} + \alpha PtB_{f(i),i})G_{i,f(i)}$$

with $PtB_k = PtcB_k + \sum_{i, f(i)=k} PtB_{f(i),i}$ where $PtcB_k$ is the power transmitted by the base station Bk on the common channel.

17. A power control method according to claim 16, characterised in that, in the calculation of Iext_down,i, only the terms corresponding to the most interfering base stations are taken into account.

18. A power control method according to claims 1,2,3,9, 10, 11 or 12, characterised in that the iteration loop of the steps (c) and (d) is itself iterated when a characteristic of a downlink between a base station Bf(i) serving a mobile station Mi is modified or when a mobile changes serving station.

19. A method of controlling the level of transmission signals in a telecommunication system comprising a plurality of transmitters Ei and a plurality of receivers Rj, each receiver Rj being capable of receiving signals transmitted by a subset Sj of transmitters and each transmission channel Lij between a transmitter Ei and a receiver Rj capable of being disturbed by a transmission on any channel Lkl with (k,l)≠(i,j), the disturbance being proportional to the power Ekl transmitted on this channel, the signal level Rij received by the receiver Rj from the transmitter Ei then able to be expressed by:

$$R_{ij} = G_{ij}E_{ij} + \sum_{k,l \neq i,j} G_{kl}^{ij} E_{kl} + N_0 \text{ that is also } R_{ij} = G_{ij}E_{ij} + Ext_{i,j} + N_0$$

where $G_{ij}$ is the attenuation on the channel $L_{ij}$ and
$G_{kl}^{ij}$ is the coefficient of coupling between the channel $L_{kl}$ and the channel $L_{ij}$ $N_0$ is the background noise $Ext_{ij}$ is the interference on the channel $L_{ij}$ the method being characterised by the following steps:

(a) initialization of the values $Ext_{i,j}$ to a predetermined value;

(b) calculation of the values $E_{ij}$ making it possible to guarantee a given signal to noise ratio $SNR_{ij}$ on the channel $L_{ij}$ given the interference levels $Ext_{i,j}$;

(c) evaluation of the interference levels $Ext_{i,j}$ on the channels $L_{ij}$ according to the transmission power levels $E_{kl}$;

the steps (b) and (c) being iterated as long as, for any channel $L_{ij}$, the difference between two consecutive interference levels $Ext_{i,j}$ is greater than a threshold value.

20. A method of controlling the level of transmission signals in a telecommunication system comprising a plurality of transmitters $E_i$ and a plurality of receivers $R_j$, each receiver $R_j$ being capable of receiving signals transmitted by a subset $S_j$ of transmitters and each transmission channel $L_{ij}$ between a transmitter $E_i$ and a receiver $R_j$ capable of being disturbed by a transmission on any channel $L_{kl}$ with $(k,l) \neq (i,j)$, the disturbance being proportional to the power $E_{kl}$ transmitted on this channel, the signal level $E_{ij}$ received by the receiver $R_j$ from the transmitter $E_i$ then able to be expressed by $$R_{ij} = G_{ij}E_{ij} + \sum_{\substack{k \in Sj \\ (k,l)=(i,j)}} G_{kl}^{ij} E_{hl} + \sum_{k \in Sj} G_{kl}^{ij} E_{kl} + N_o \quad \text{that is also}$$

$$R_{ij} = \left[ G_{ij}E_{ij} + \sum_{\substack{k \in Sj \\ (k,l)=(i,j)}} G_{hl}^{ij} E_{kl} + N_o \right] + Extra_{i,j}$$

where $G_{ij}$ is the attenuation on the channel $L_{ij}$ and $G_{kl}^{ij}$ is the coefficient of coupling between the channel $L_{kl}$ and the channel $L_{ij}$ $N_0$ is the power level of the background noise $Extra_{ij}$ is the interference on the channel $L_{ij}$ due to the transmitters outside $S_j$ the method being characterised by the following steps:

(a) initialization of the values $Extra_{i,j}$ to a predetermined value (b) calculation of the values $E_{ij}$ making it possible to guarantee a given signal to noise ratio $SNR_{ij}$ on the channel $L_{ij}$ given the interference levels $Extra_{i,j}$;

(c) evaluation of the interference levels $Extra_{i,j}$ on the channels $L_{ij}$ according to the transmission power levels $E_{kl}$;

the steps (b) and (c) being iterated as long as, for any channel $L_{ij}$, the difference between two consecutive interference levels $Extra_{i,j}$ is greater than a predetermined threshold.

* * * * *